(12) United States Patent
Erickson et al.

(10) Patent No.: US 12,178,152 B2
(45) Date of Patent: Dec. 31, 2024

(54) APPARATUS FOR SEEDING

(71) Applicant: Botanic Gardens and Parks Authority, Kings Park (AU)

(72) Inventors: Todd Erland Erickson, Kings Park (AU); Andrew Louis Guzzomi, Crawley (AU); Monte Ian Masarei, Crawley (AU); David John Merritt, Crawley (AU)

(73) Assignee: THE UNIVERSITY OF WESTERN AUSTRALIA, Crawley (AU)

( * ) Notice: Subject to any disclaimer, the term of this patent is extended or adjusted under 35 U.S.C. 154(b) by 244 days.

(21) Appl. No.: 17/864,892

(22) Filed: Jul. 14, 2022

(65) Prior Publication Data
US 2023/0020374 A1    Jan. 19, 2023

(30) Foreign Application Priority Data

Jul. 14, 2021 (AU) ................................ 2021902156
Aug. 25, 2021 (AU) ................................ 2021221632

(51) Int. Cl.
*A01C 7/16* (2006.01)
*A01C 7/20* (2006.01)

(52) U.S. Cl.
CPC ............... *A01C 7/16* (2013.01); *A01C 7/203* (2013.01)

(58) Field of Classification Search
CPC ............ A01C 7/16; A01C 7/203; A01C 5/066
See application file for complete search history.

(56) References Cited

U.S. PATENT DOCUMENTS

| 5,425,318 A * | 6/1995 | Keeton ................... A01C 5/066 111/197 |
| 8,011,440 B2 * | 9/2011 | Ryder ..................... A01C 7/203 172/260.5 |
| 2020/0352089 A1 * | 11/2020 | Kaiser .................. A01C 23/023 |

FOREIGN PATENT DOCUMENTS

| CN | 110637567 A * | 1/2020 | |
| DE | 102006034798 A1 * | 2/2008 | ............. A01B 63/24 |
| EP | 3269221 B1 * | 11/2020 | ............. A01C 5/068 |

* cited by examiner

*Primary Examiner* — Donnell A Long
(74) *Attorney, Agent, or Firm* — Crowell & Moring LLP; John C. Freeman

(57) ABSTRACT

A brush arrangement of an apparatus includes a brush connected to a brush support. The brush support can be or include at least one four-bar linkage, trails the outlets of the seed metering device. The brush sweeps fine loose material over seeds placed on the soil surface allowing rocks to be left in place in/on the soil while the deposited seeds are lightly covered with soil by the brush. The brush arrangement can be coupled with soil manipulation apparatus, e.g., including a tool/tine support, onto which one or more soil engaging tools mount(s). The soil engaging tool may include or be at least one knifepoint, sweep, disc, blade, or other tillage equipment to engage into the soil and loosen compacted or crusted soil ahead of depositing the seeds. Brush breakout can be accommodated by a breakout coupler and optional adjustable breakout force.

31 Claims, 6 Drawing Sheets

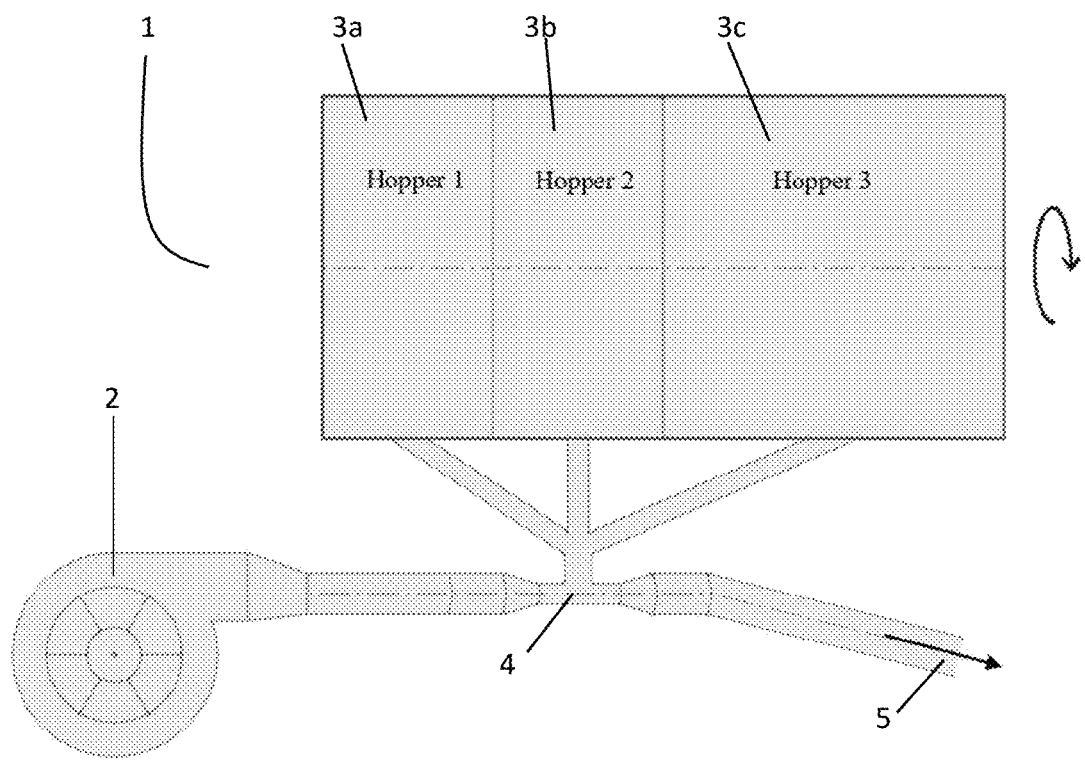
Fig 1 – Prior Art
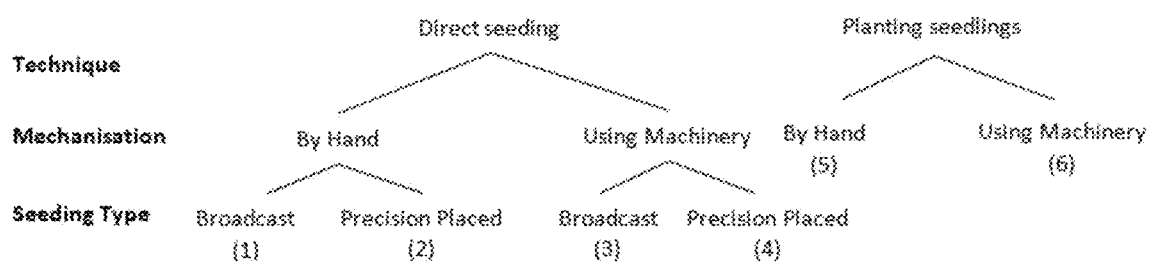
Fig 2 – Prior Art

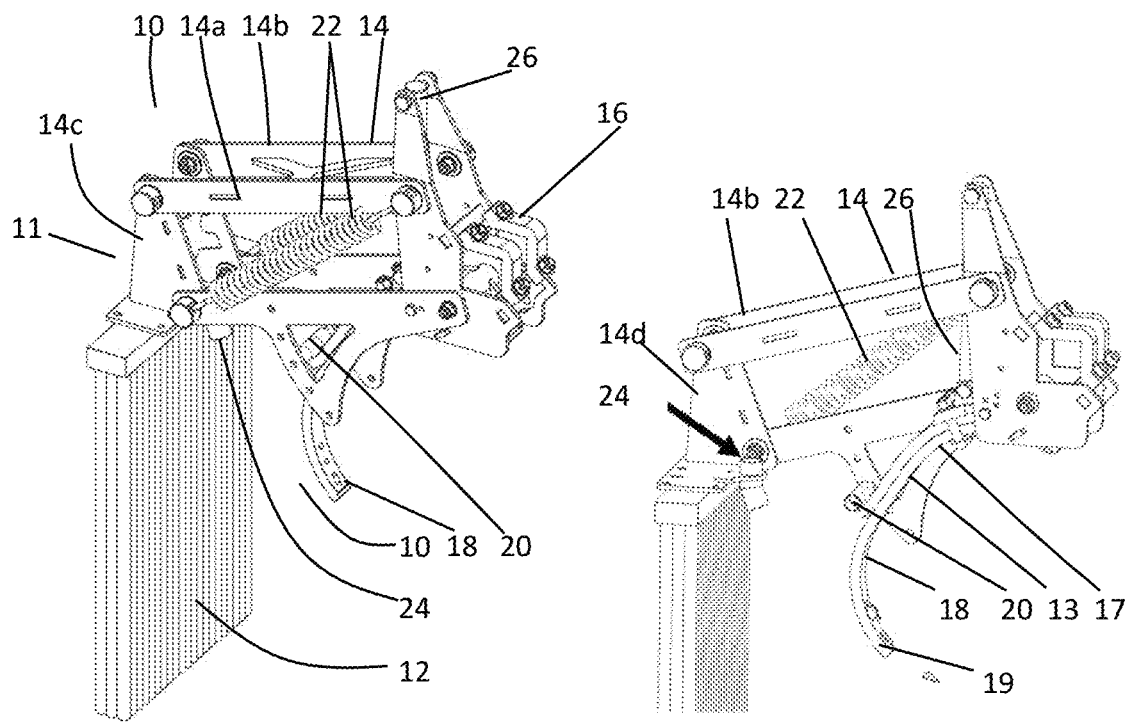
Fig 4A
Fig 4B
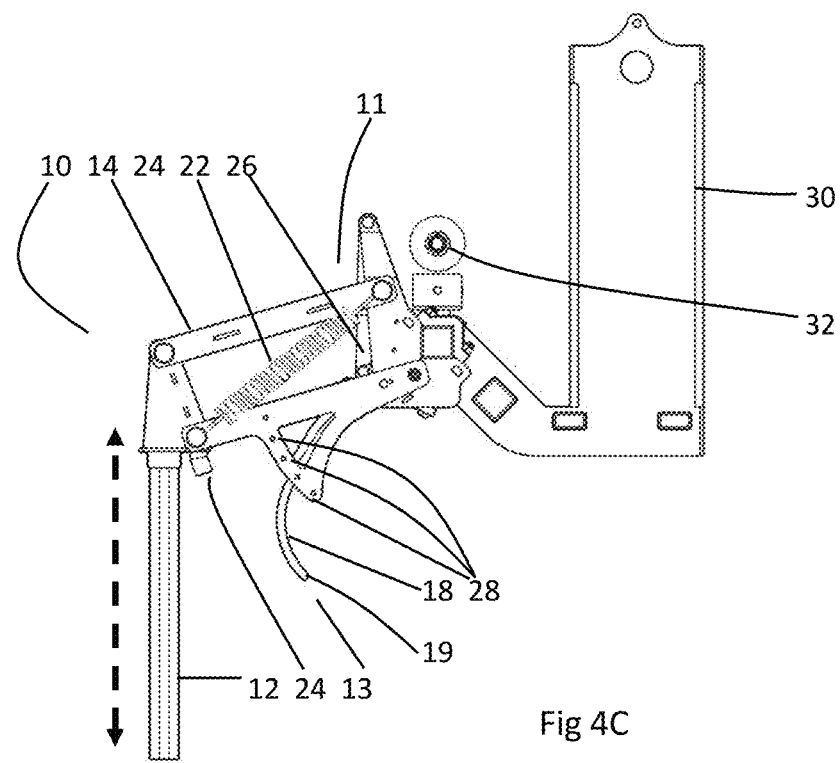
Fig 4C

APPARATUS FOR SEEDING

This application claims under 35 U.S.C. § 119(a) the benefit of the filing dates of: 1) Australian Patent Application No. 2021902156, filed on Jul. 14, 2021, and 2) Australian Patent Application No. 2021221632, filed on Aug. 25, 2021, the entire contents of each of which are incorporated herein by reference.

BACKGROUND OF THE INVENTION

Field of the Invention

The present invention relates to apparatus for use in seeding, such as for sowing plant seeds or for sowing seed carriers such as pellets, pats, pucks, balls including seeds.

The present invention is particularly, though not solely, applicable to apparatus for use in seeding/sowing plant seeds for restoration of disturbed soils, such as dryland areas, open-cut mine sites, strip mine sites or disturbed agricultural land, undergoing restoration. It will be appreciated that these are non-limiting examples and the present invention is applicable to other suitable areas and soils requiring rehabilitation or re-establishment of plant life.

Description of Related Art

Maintenance and restoration of natural ecosystems is of global importance. Climate change and land disturbance, such as through mining and infrastructure projects, can degrade or make establishment of plant regrowth slow or impossible. Restoration of dryland areas and/or disturbed soils around industrial and mine sites is particularly challenging, with re-establishment of vegetation historically having low success rates.

For example, mining disturbs large areas of natural ecosystems each year. Mandates are often in place to ensure restoration of degraded sites to re-establish the ecosystem and conserve biodiversity, particularly once operations cease, such as at the end of life of a mine site.

Despite the need, large scale restoration techniques often fail. When trying to re-establish native plant growth, particular conditions are needed for successful seed germination. Germinating native seeds to re-instate plant communities on degraded sites necessitates understanding of complex native seed biology, as well as plant-soil-environment interactions in varying weather conditions and in a changing climate.

Suitably engineered and employed tools can significantly help to manipulate the abiotic and biotic conditions required to facilitate plant establishment and ecosystem restoration, and thereby improve success rates.

Economic benefits flow from efficient and effective tools and equipment that aid successful plant re-establishment.

Challenges occur through the inability to control the depth for sowing seeds, particularly in dryland or degraded soils. For example, to seed on difficult sloped terrains in harsh soil conditions including rocky soils or to sow seeds of varying morphological structures creates significant limitations of known seeding equipment.

Revegetation is usually carried out either by the return of seeds to a site or through the planting of cultivated plant stock. Seeds may be returned to a site either by respreading original topsoil which naturally contains seeds, or by directly seeding the site by hand or mechanically. Cultivated plants can also either be hand planted or mechanically returned.

However, due to the diverse nature of reinstating an ecosystem containing a variety of plant species with varying requirements, restoration often requires a combination of multiple seeding techniques. As an example, lack of rainfall and high evapotranspiration rates in dryland conditions means dryland species have developed diverse seed dormancy and recruitment strategies to cope with variable and sporadic moisture availability.

It has been realized that accommodating such biological mechanisms when considering planting or seeding as part of restoration, particularly for man-made (e.g., mine site restoration in parts of Australia) or natural dryland areas, can lead to better outcomes for germination, emergence, and long-term plant establishment.

Known restoration techniques include deep ripping of the soil to create deep furrows. For example, waste soil and rock waste dumps from mining operations are typically re-profiled to an angle of 15° with some slopes reaching up to 18° or 20°. Deep ripping may be carried out to depths of between 100 mm and 800 mm. Where slopes are thought to be prone to slope failure caused by water runoff, the sawtooth topography created by deep ripping is thought to help retain water infiltration in the furrows (water harvesting') and therefore promote germination, establishment and plant growth. However, poor plant establishment from seeded species indicates that deep ripping is not particularly effective.

Known seeding techniques include mechanical broadcasting. For instance, in some mining environments seeding can be conducted with air seeding units attached above the deep ripping tynes of a bulldozer. These units meter seeds into a delivery tube, and seeding rates are adjusted by increasing or decreasing the size of an orifice delivering the seeds to the deep ripped furrows. In some cases, seeds from species with different morphological properties or ecological function are separated in different compartments so that they can be metered at differing rates. A fan blows the seeds out of the seeder at a required metered rate.

A limitation to these air seeding arrangements is that they are not coupled with any soil incorporation mechanism and exist solely to meter and distribute seed. Without any additional soil incorporation stage, seeds remaining on the surface of the deeply ripped soil profile are prone to germination and emergence failure. Surface sown seeds are particularly prone to desiccation in regions where air temperatures can reach 50° C. and soil surface temperatures as high as 75° C.

Sowing seeds by aerial broadcasting is popular due to the ability to distribute seeds at a low cost quickly over large areas with the aid of simple machinery. However, winds can blow surface sown seeds off the target restoration sites. Predation is also an issue with various species of insects, rodents and birds eating or removing seeds broadcast on restoration sites.

Rainfall is sporadic and varied in dryland areas. Without irrigation, seeds must persist on restoration sites for long periods, years in some cases. Ensuring the long-term viability of seeds by incorporating them into the soil profile of restoration sites is therefore extremely important. Deep ripping, however, makes burial to a suitable level for plant recruitment in the soil profile difficult or impractical.

Large, heavy industrial vehicles are typically used for deep ripping and seeding during restoration of mine sites due to their ready availability, ruggedness and suitability for the environment, plus the availability of trained drivers. Such vehicles can cope with the terrain and large rocks encountered during deep ripping. The vehicles, such as bulldozers, can ride over large rocks. However, such large tracked vehicles tend to pitch fore and aft over large rocks, causing the ripper box mounted seeding equipment to pitch with the vehicle, thereby making seeding difficult or at least inaccurate, particularly for seeds that optimally require a few 10 s of mm seeding depth, adding to the low regrowth success rate.

Alternatively, precision seeding (such as drill seeding) places seeds at a particular depth within the soil profile and/or with seeds at a particular spacing on the soil surface. Precision seeding can more accurately deliver seeds into soil conditions conducive to germination, emergence, and establishment, increasing overall seed use efficiency. Precision seeding ensures seeds are covered and embedded in the soil profile, increasing seed-soil contact and protecting seeds from predation. Placing seeds in optimal micro-sites can lead to far higher germination percentages than broadcasting seeds on the soil surface and, therefore, lead to a lower cost per established plant.

Seeds of wild plant species often possess physical and morphological traits that impede controlled and reliable delivery, even by known precision seeding machinery designed for horticulture and cropping. Seeds of most grasses are contained within complex floret structures that have dense hairs and possess protruding awns and lobes, precluding their flow through seeder tubing. For many such native species, the only option is to remove the seeds from their florets or remove the obstructing appendages from the florets before seeding to increase seed flow, adding cost and time to the process due to the logistical challenges of doing so at large scales and high volumes.

Another challenge associated with the use of conventional direct seeding machinery is the limited capacity to sow seeds in complex, heterogeneous topographies. Such topography is common in the mining sector where landforms can be rocky and graded to slopes of 15° or more.

Seeding may preferably be decoupled from vehicle pitching, and ideally provides yaw and/or roll degrees of freedom or requires drives with more favourable geometry and/or independent suspension arrangements.

Effective direct seeding using known techniques and equipment has limitations arising from unpredictable precipitation patterns. Competition from weeds, predation and low germination rates are also common limitations to successful plant establishment. Mechanical limitations to effective direct seeding include inability to effectively operate seeding machinery over complex terrain, limits to seed depth placement accuracy and precision and the inability to sow over complex terrain and difficult soils.

It is preferred that seeds be placed in the soil profile at a depth that does not exceed that at which seedlings can emerge, a depth likely dictated by the mass of their internal energy stores. Seeding machinery incorporating agricultural-style 'ripper' tines, or disc opener assemblies, to control depth can have some success when operating over flat or gently undulating open areas and uniform soil with minimal rock.

However, these current designs are not well suited to sowing many native seeds in more complex environments. Aside from depth control, spatial control of seeds is also a limitation in known seeding equipment e.g. broadcast seeding creates random spacing, and precision seeding is useful for depth control but cannot ensure suitable spatial control for particular environments, such as for Australian native plants in poor quality soils with low rainfall, requiring managed spacing to reduce competition.

Seeding mechanisms that are used in agriculture are often designed to sow seeds much deeper than is required by native seeds, which is reflected by the difference in distribution of seed mass between native and agricultural seeds.

Native seeds, particularly Australian native seeds e.g. Triodia pungens (T pungens), on average have much smaller seeds than those of typical agricultural crops such as wheat. Consequently, particularly with regard to such native seeds, current seeding technologies need to be adapted or new seeding solutions need to be developed to improve accuracy of seed placement at the optimal location within the soil profile to increase the probability of seed germination and emergence outcomes.

Although modern agricultural seeding devices suit agricultural seeds well, seeding depth variation is likely too high for smaller native species, such as, though not limited to, the Pilbara region of Australia. Compounding the issue rocky soil profiles may, in effect, reduce the maximum emergence depths of seeds sown in such a profile, increasing the need for better depth precision.

Seeding on the extremely harsh rocky, skeletal soil which can be found on many mine rehabilitation or restoration sites can lead to the mechanical failure of the components (particularly soil agitation parts) of agricultural seeding devices. Since the rocks and gravel are desired in the soil profile to provide niches where water and seed can concentrate, and to provide landform stability, rehabilitation or restoration sites cannot be cleared of rocks to more easily plant as is the case in agriculture.

Compaction and crushing issues are also present when sowing into soils with high silt and clay content when using devices such as press wheels which press the soil to improve seed soil contact. Press wheels may also fail to adequately press the soil since a rock matrix in the soil may render the soil profile effectively rigid.

With the aforementioned in mind, it is desirable to provide a seeding apparatus which improves control of seed sowing depth or at least provides an alternative to known seed sowing machines.

SUMMARY OF THE INVENTION

An aspect of the present invention provides an apparatus for use in seeding, including a brush arrangement including at least one brush arranged to mount to a vehicle and following a soil manipulation (soil conditioning or soil agitation) apparatus, wherein, in use, the at least one brush sweeps soil particles over seeds placed on the soil surface or into a channel or hole in the soil created by the soil manipulation (soil conditioning or soil agitation) apparatus.

It will be appreciated that soil manipulation can include one or more of soil conditioning, soil agitation, soil breakup, ripping, ploughing, tilling, furrowing, creating one or more channels, grooves, recesses or holes, or a combination of any two or more thereof, in the soil.

The vehicle may be coupled to a vehicle, may be self-powered, or may include a trailer for towing.

The brush arrangement may include at least one linkage arrangement accommodating upward and downward motion of the at least one brush. The at least one linkage arrangement may include at least one four-bar linkage. The at least one linkage arrangement may include laterally spaced four bar linkages. The respective linkage arrangement may include or be a linkage mechanism.

At least one seed delivery outlet may be provided to deliver the seed ahead of the respective brush. The at least one seed delivery outlet may receive seed from a seed delivery device, which may include a seed metering device. The seed delivery and/or metering device may be mounted to the vehicle. The seed delivery and/or metering device may include an air seeder to provide the seed(s) to the outlet.

Seed delivery, metering and/or sowing can include providing seeds, treated seeds and/or seed carriers such as pellets, pats, pucks, balls carrying the seeds, or combinations of any two or more thereof.

The soil manipulation (e.g., conditioning or agitation) apparatus may include at least one ground engagement or soil engaging tool, such as tillage, ripping or ploughing equipment, e.g., having at least one knife point, sweep, disc or blade attached to a tool support, such as a supporting tine, to loosen compacted or crusted soil to provide loose fines for sweeping by the respective brush.

The apparatus may include at least one breakout coupler enabling the soil manipulation apparatus to cause the at least one brush to lift from engagement with the soil.

Preferably, the soil manipulation apparatus includes a breakout or lift mechanism to lift the at least one tool support, such as a tine, disc or blade from engagement with the soil. Sufficient breakout of the respective tool support (e.g., tine) of the soil manipulation apparatus enables the soil manipulation apparatus to act on the breakout coupler to breakout the respective brush from engagement with the soil. The brush arrangement may include multiple breakout coupler attachment positions.

The apparatus may be arranged and configured to mount to a multi-shank ripper box of a vehicle, such as a bulldozer.

A further aspect of the present invention includes a method of seeding that includes travelling a vehicle over terrain, using the soil manipulation (agitation) apparatus to create a channel, furrow, recess or hole in the soil, depositing seed into the channel, furrow, recess or hole, using at least one brush to sweep particulates of the soil over the seed.

The method may include providing a seed delivery outlet between a ground engaging blade, disc or knifepoint of the soil manipulation apparatus and the brush, and deliver the seed from the outlet to the channel or hole.

The seed(s) may be delivered by the seed delivery device, such as a seed metering device, into the channel, furrow, recess or hole.

The method may include sweeping the soil particulates over the seed in the channel or hole to a seed depth of up to 50 mm, preferably up to 20 mm, more preferably up to between 5 mm and 20 mm deep from the swept soil surface over the channel or hole.

Another aspect of the present invention provides an apparatus for use in seeding, the apparatus including a brush arrangement including at least one brush for support on a vehicle.

The vehicle may include a dozer (e.g. a bulldozer), tractor or other industrial or commercial vehicle, or be a towed vehicle, such as a trailer.

The brush arrangement may include at least one brush connected to a brush height mechanism. The brush height mechanism may include at least one four-bar linkage (e.g. at least one four-bar linkage mechanism), such as enabling upward and downward motion of the at least one brush.

Other arrangements of brush upward/downward motion accommodation are envisaged to fall within the scope of the invention, such as flexible and/or resilient means, such as one or more flexible/resilient arms.

The at least one brush may follow/trail one or more outlets of the seed delivery device (e.g. a seed metering device or air seeding device/mechanism) and sweeps fine loose soil material over seeds placed on the soil surface.

The apparatus may include multiple breakout coupler attachment positions.

The apparatus may include rest position means for controlling rest position of the brush mechanism and/or brush.

The apparatus may include at least one biasing means to control the rest position of the brush mechanism as well controlling down force provided by the brush to the soil. The biasing means may include at least one spring, at least one weight, at least one elastomer member, or a combination of any two or more thereof.

A position lock may be provided for locking the position of the brush mechanism to restrict a degree of freedom of movement of the respective brush. A motion limiter may be provided for limiting or restricting range of motion of at least one four bar mechanism that control(s) brush height/position.

The apparatus may include a seed spreading device, a seed delivery device or seed diffuser to regulate distribution of the seeds across a width of at least one brush.

Another aspect of the present invention provides a method of seeding includes travelling a vehicle over terrain, using a soil manipulation apparatus to loosen soil particles, depositing seeds onto the soil surface or into a channel, furrow, recess or hole in the soil and using at least one brush to sweep particulates of the soil over the seeds.

A seed delivery outlet may be provided and seeds may be delivered between a ground engaging tool of the soil manipulation apparatus and the brush. The seeds may be delivered via seed delivery device and/or seed metering device.

Seed delivery and/or metering may include delivery and/or metering of the seed by air or gravity seeding onto the soil surface or into the channel, furrow, recess or hole in the soil.

One or more embodiments of a method of the present invention may include sweeping the soil particulates over the seed on the soil surface or in the channel, furrow, recess or hole to a seed depth of up to 25 mm, preferably up to 20 mm, more preferably up to between 1 mm and 20 mm deep from the swept soil surface over the channel, furrow, recess or hole.

A rest position of the brush mechanism and/or brush may be controlled. At least one biasing means or biasing mechanism may be used to control the rest position of the brush mechanism as well as controlling down force provided by the brush to the soil. The at least one biasing means may include at least one spring, at least one weight, at least one elastomer member, or a combination of any two or more thereof.

Locking the position of the brush mechanism may be provided, e.g. to restrict a degree of freedom of movement of the respective brush.

Limiting or restricting range of motion of at least one four bar mechanism may be provided so as to control(s) brush height/position.

Embodiments of the present invention enable a unique approach to seeding that is in contrast to the traditional agricultural approach where seeds are sown "into" the existing soil profile by mechanically opening and placing seeds into a furrow which is then mechanically closed by a closing device (e.g. press wheel).

One or more embodiments of the present invention allow rocks to be left in place whilst the seeds are covered lightly with soil particles. Seeds can be covered by the soil particles moved by the at least one brush preferably to a depth <20 mm.

The apparatus can be provided in conjunction with soil engaging tools to loosen compacted or crusted soil to provide loose fines for sweeping before seed placement.

Soil engaging tools may condition/manipulate/agitate the soil before sweeping at least some of the soil by the at least one brush.

The soil engaging tools may include a breakout or lift mechanism, which may include a hydraulic breakout (lift) mechanism.

The apparatus is preferably passive, in the sense that contact with the soil surface is maintained until rock obstacles in the soil profile are encountered which force a tyne of the soil manipulation (agitation) apparatus to "break out" or lift up over the obstacle.

A breakout coupler can be provided to allow the soil engaging tool to cause the brush arrangement to move e.g. to lift, during such breakout.

The breakout coupler may be part of the brush arrangement e.g. may span two sides of the brush height mechanism. This allows the brush to maintain contact with the soil surface and continue until a large displacement of the breakout tine is induced by a large obstacle.

The apparatus can mount directly to a multi-shank ripper box and can be provided below a seed metering device.

It will be appreciated that whilst the following particular embodiments are described with reference in places to soil manipulation apparatus (e.g. conditioning or agitation), the present invention finds application with other ground/soil engaging apparatus.

The brush may include bristles of a flexible material, which may be formed of or include a synthetic polymer material or organic fiber or combination thereof. Bristle length may be between 0.3 m and 1.5 m, preferably between 0.5 m and 1.2 m, more preferably between 0.75 m and 1.2 m, yet more preferably between 0.8 m and 1.1 m, and even more preferably about 1.0 m. Bristles may be provided that can flex up to 180 degrees. Multiple individual bristles are attached to or sealed into a base to form an individual brush. The base may be of size 100 mm by 600 mm. However, other base sizes are encompassed in the present invention, such as between 50 mm and 1000 mm in one dimension and between 50 mm and 1000 mm in another dimension for a multiple sided base.

It is to be understood that, if any prior art is referred to herein, such reference does not constitute an admission that the prior art forms a part of the common general knowledge in the art, in Australia or any other country.

BRIEF DESCRIPTION OF THE DRAWINGS

One or more embodiments of the present invention will hereinafter be described with reference to the accompanying Figures, in which:

FIG. 1 shows an example of a known seeding arrangement.

FIG. 2 shows examples of known seeding techniques.

FIG. 4A shows a perspective view of a brush arrangement and brush height mechanism for mounting to a vehicle according to an embodiment of the present invention.

FIG. 4B shows a partial view of the apparatus in FIG. 4 with seed metering device outlet mounted immediately above and leading the brush according to an embodiment of the present invention.

FIG. 4C shows a side view of an apparatus according to FIGS. 4A and 4B arranged and configured to mount to a ripper box mount of a vehicle, according to an embodiment of the present invention.

DESCRIPTION OF PREFERRED EMBODIMENT(S)

Figure 3:
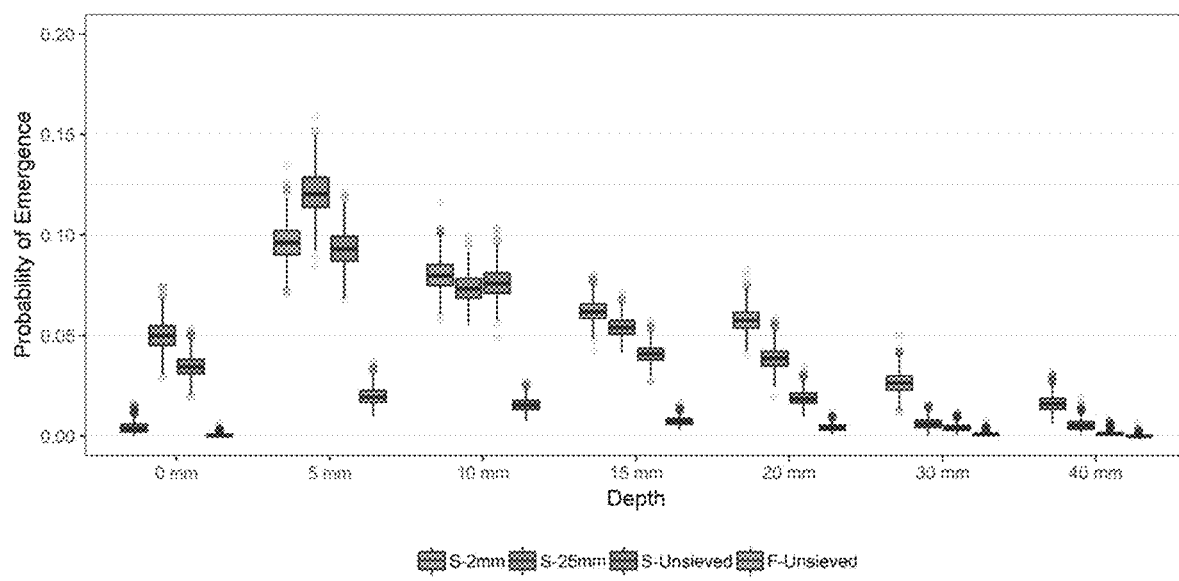
FIG. 3 shows a chart of probability of emergence for Australian native seeds vs seed depth compared against varying concentrations of rock content.

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

FIG. 1 shows a diagrammatic example of a seed broadcaster arrangement 1 utilising a blower fan 2 to blow seeds from a number of hoppers 3a, 3b, 3c by venturi effect via a venturi tube 4 to an outlet 5 to supply seeding hoses for final delivery to the ground. Seed delivery depth and spacing is poorly controlled due to the randomness of seed flow and lack of control of number of seeds and timing of seed delivery.

FIG. 2 provides, for background purposes, examples of seeding options, such as manual and machine delivered broadcasting and precision placement.

The chart (Tukey boxplot) of FIG. 3 shows predicted probability of emergence for Australian native seeds (*Triodia pungens: T pungens*) vs seed depth at each of 7 experimental depths. The horizontal black band in each box plot represents the median prediction of the probability of emergence for each treatment. The lower and upper hinges represent the first and third quartile, respectively, whilst whiskers represent 1.5 times the interquartile range and outliers are represented by circles. Treatments are represented as seeds/florets—soil type e.g. seeds (S), florets (F) sown in soil sieved to 2 mm, 25 mm or left unsieved.

At shallow burial depths of <15 mm, rock content of the soil did not significantly affect emergence. However, strong evidence exists for a trend towards a reduction in emergence with increasing rock content in the soil when burying seeds to greater than or equal to 15 mm. When buried >15 mm, the probability that seeds in soil sieved to 2 mm exhibit greater emergence than seeds in soil sieved to 25 mm, which also exhibit greater emergence than seeds in unsieved soil, is 0.87. This probability increases with increasing burial depth and the trend is not present when buried shallower than 15 mm. For 25 mm sieved and unsieved soils, burial to 30 mm or deeper yielded a predicted emergence of near zero (<0.006). In soil sieved to 2 mm, however, the predicted emergence was 0.026 and 0.016 when buried to 30 mm and 40 mm respectively, indicating that the presence of rocks truncated the maximum emergence depth (FIG. 3).

An example of employment of an embodiment of the present invention will hereinafter be described. However, the breadth and scope of the present invention is not to be limited by this particular example. Other embodiments are considered to fall within the breadth and scope of the invention as would be understood by the relevant person skilled in the art.

Commercial and industrial earth moving vehicles, such as bulldozers are a typical means for carrying air seeding equipment. Air seeding equipment uses a flow of air to deliver seeds from one or more hoppers to prepared ground across mine site areas to be rehabilitated or restored. Tracked vehicles are preferred for working on steep slopes common to mine site restoration.

Embodiments of the present invention include a vehicle mountable seeding apparatus 10 (such as mountable on a bulldozer) arranged and configured for aiding seed placement by managing seed burial depth while minimizing rock obstacles in the path of seed growth.

A brush arrangement 11 of the apparatus 10 includes a brush 12 connected to a brush support 14. The brush support can be or include at least one four-bar linkage, trails the outlets of the seed metering device. The brush sweeps fine loose material over seeds placed on the soil surface. This approach is in contrast to the traditional agricultural approach where seeds are sown into the soil profile by opening a furrow and placing seeds into a furrow which is then closed.

Embodiments of the present invention allow rocks to be left in place in/on the soil whilst the deposited seeds are lightly covered with soil by the brush. Preferably the brush does not move rocks and thereof does not cover the seeds with rocks that would otherwise reduce likelihood of germination and/or emergence. Seeds can be sown to depths <20 mm.

Apparatus 10 embodying the present invention includes a brush arrangement 11. The brush arrangement can be coupled with soil manipulation apparatus 13 (e.g. soil conditioning apparatus, soil manipulation apparatus or soil agitation apparatus), which may include a tool support 18 (which may be termed a tyne or tine), onto which one or more soil engaging tools 19 mount(s). The soil engaging tool 19 may include or be at least one knifepoint, sweep, disc, blade, or other tillage equipment to engage into the soil and loosen compacted or crusted soil ahead of depositing the seeds. It will be appreciated that herein the term 'tine' or 'tyne' can be used to refer to the tool support or the ground engaging tool, or both in combination. This soil manipulation, such as tilling, provides loose fines for sweeping before seed placement occurs.

It will be appreciated that embodiments of the present invention can be readily integrated into known restoration or agricultural practices.

A brush support 14 of the brush arrangement 11 can be controlled to compensate for pitch movements of the vehicle to which the apparatus is mounted. Thus, soil engaging tool depth into the soil and/or brush sweep height acting on the particles of soil can be controlled to aid optimal seed depth coverage.

The brush support can include at least one four bar linkage mechanism arrangement. FIG. 4A shows an embodiment with two parallel four bar linkage mechanisms 14a, 14b.

The brush 12 in the embodiment of FIG. 4A is supported by brackets 14c, 14d. A seed delivery tube 24 is provided between the four bar linkage mechanisms 14a, 14b. Height and direction of seeding can be controlled by the location and outlet direction of the delivery tube 24. It will be appreciated that the seed delivery tube is connected in use to a seed metering device or air seeder device to supply the seeds for sowing.

The brush height mechanism can mount to a vehicle or support on a vehicle via a mount device 16, such as by mounting brackets shown.

The brush height mechanism can be used in conjunction with other soil manipulation (agitation) apparatus 13, such as soil engaging tools. It will be appreciated that the brush height mechanism/brush support can be mounted in conjunction with other tillage and soil manipulation (agitation) apparatus, such as a spring tine or disc opener mechanism.

For example, one or more soil engaging tools can be provided/supported on (e.g. attached to) a tool support, such as a tine 18. The tool support or each support, e.g. the tine(s) 18, can be configured to 'break out' of engagement with the soil when the respective soil engaging 19 tool hits a large rock. Such breakout can be damped/controlled by a tine breakout damper arrangement 26 providing a preload force.

In the event that the soil engaging tool 19, and therefore the tine 18, strikes a rock and overcomes the preload force, the soil engaging tool 19 and tine 18 breaks out of engagement with the soil and pivots upwards. The tine 18 can contact a breakout coupler 20 and cause the brush support 14 (and therefore the attached brush 12) to lift.

It will be appreciated that reference to a 'tyne' or 'tine' in this specification can be a tool support, such as an arm, for the soil engaging tool or the tool, or both. The tool support and the soil engaging tool can be separate components connected together or a one-piece (unitary) component.

For example, in the event that the soil engaging tool strikes a large rock, soil engagement and brush sweeping can be disengaged from contact with the soil to protect the soil manipulation apparatus and brush height mechanism.

Likewise, if the vehicle moving forwards with the brush and soil engaging tool mounted to the rear thereof pitches upward at the front, the brush and soil engaging tool will tend to be biased to engage deeper with the soil by the rear of the vehicle tending to bias downwards as the vehicle rotates about its centre of mass. The breakout arrangement and the brush support can operate to compensate for such adverse pitching.

Preload of the brush support 14 can be adjusted/controlled by selecting the resilience of resilient means, such as spring force and/or number of springs, connected across one or more linkage mechanisms 14a, 14b, such as four bar linkage mechanisms.

It will be appreciated that preload and height control can be provided by active control, such as one or more rams operated by pneumatic or hydraulic action.

The breakout coupler 20 can be positioned at one of a selection of positions 28 (see FIG. 4C), such that breakout of the soil engaging tool from the soil acting via the support/tine on the brush support can be preset. For example, the breakout coupler 20 can include a member connected between the parallel four bar linkage mechanism arrangements 14a, 14b, and the position of that member can be moved to one of a selection of positions 28. Selection of the breakout coupler 20 position 28 can determine no breakout (upper position), partial breakout (mid position), or full breakout (lower position).

The brush arrangement 11 and soil manipulation apparatus 13 can be mounted to a vehicle via a vehicle mount 30, such as a box mount 46 (FIG. 8) e.g. multi-shank ripper box mount).

Breakout damping can be provided via one or more accumulators 32 connected to the tool support/tine breakout damper 26.

Figure 5:
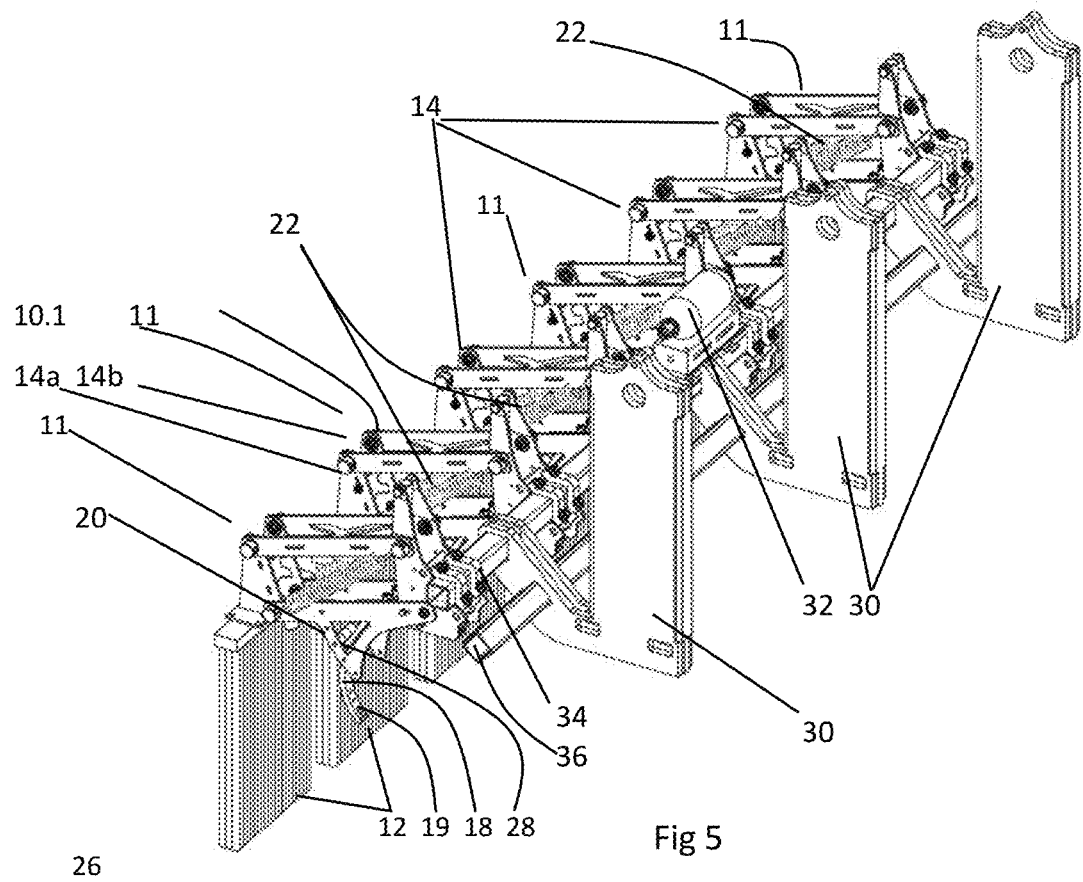
FIG. 5 shows a perspective view of apparatus incorporating multiple arrangements according to one or more embodiments of the present invention.
Figure 6:
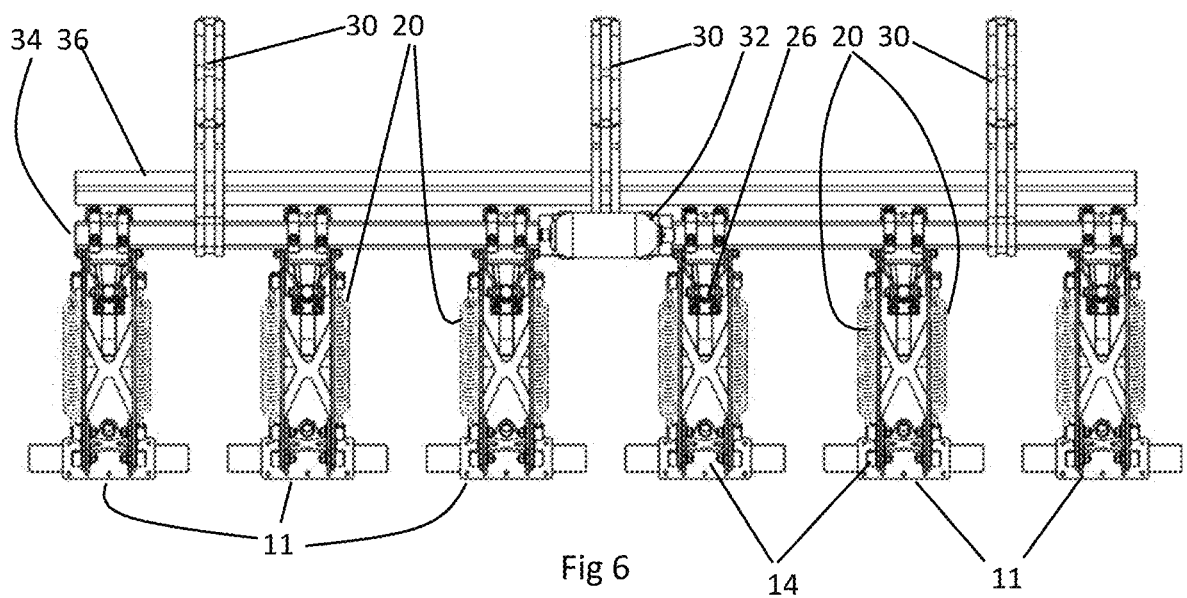
FIG. 6 shows a top view of the apparatus shown in FIG. 5.

As shown by way of example in FIGS. 5 and 6, an apparatus 10.1 embodying the present invention can be provided with multiple brush height mechanisms 11, e.g., brush height mechanisms 11 arranged transversely inline on a support member 34, such as connected to a box mount (multi ripper box mount) 46.

Multiple brush height mechanisms 11 can have a brush support 14 to accommodate breakout motion. Each of the brush supports 14 can include resilient damping for breakout damping, such as resilient means 22 e.g. springs. Linkage arrangements 14a, 14b accommodate breakout motion for each respective brush 12. One or more of the linkage arrangements can include a four-bar linkage accommodating up-down motion of the respective brush 12.

A breakout coupler 20 can be provided for one or more of the brush arrangements 11. The respective breakout coupler 20 can be acted on by a tine 18 of a soil manipulation (agitation) apparatus, such as a soil engaging tool.

Position of the breakout coupler can be adjusted, such as by selecting a position 28 on the respective brush arrangement 11 (e.g. spanning between adjacent linkage arrangements 14a, 14b of a particular brush support 14). It will be appreciated that each brush height mechanism can operate independently whilst providing part of a whole seed sowing arrangement.

Breakout damping for the soil manipulation apparatus can be provided for one or more soil engaging tool, such as by a respective damper acting to dampen upward motion of a respective soil engaging tool/tyne 18 should the soil engaging tool impact a rock or meet sufficient resistance to cause the tool support/tyne to lift.

Figure 7:
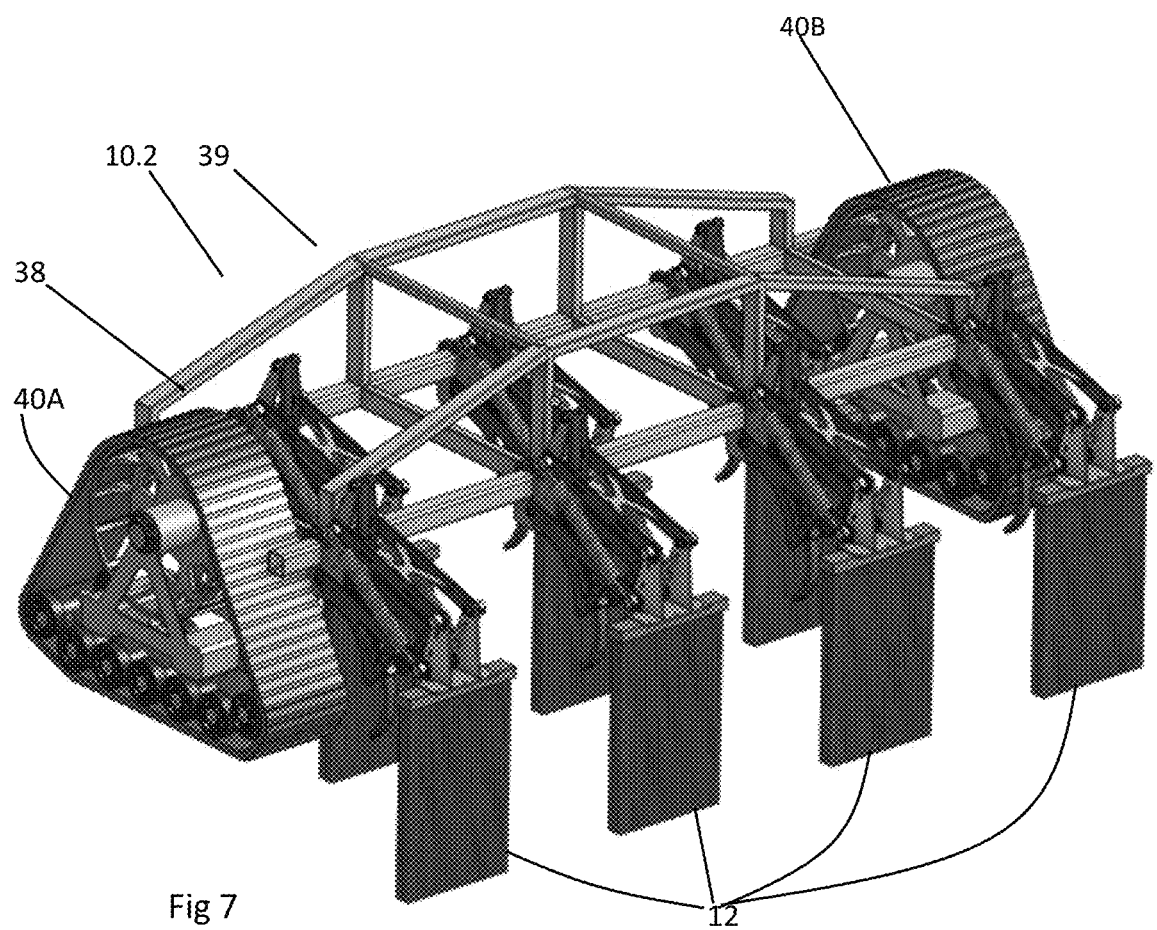
FIG. 7 shows a perspective view of a track deployed apparatus according to an embodiment of the present invention.

As shown in FIG. 7, embodiments of the apparatus 10 can include one or more brush height mechanisms 11 and one or more soil manipulation apparatus 13. As shown in FIG. 7, the apparatus 10.2 can be vehicle mounted, and may be provided on a support frame 38. The vehicle may be a trailer 39 or may be self-moving/powered. The vehicle can have multiple ground engaging means, such as wheels or tracks 40A, 40B. One or more brush height mechanisms and one or more soil manipulation apparatus can be provided as a combined apparatus for soil manipulation apparatus and seed positioning.

Figure 8:
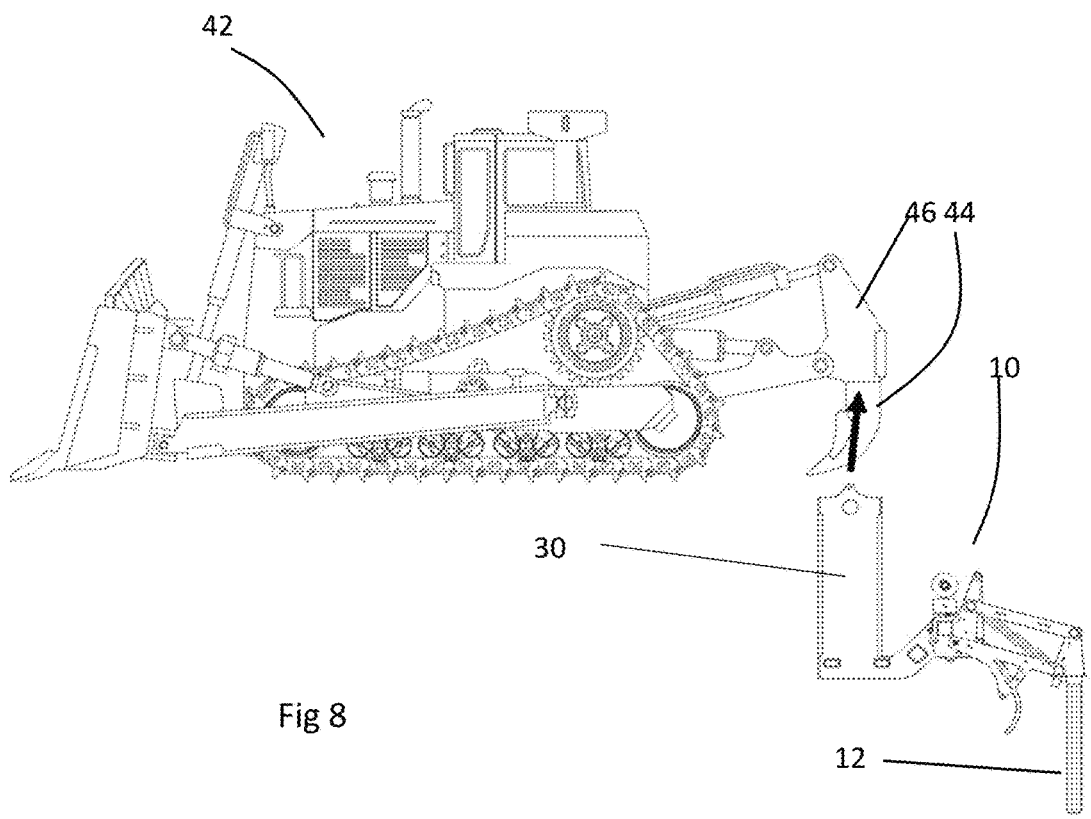
FIG. 8 shows a side view of a vehicle with rear equipment mount and showing the option to replace ripper tines with an apparatus according to an embodiment of the present invention.
Figure 9:
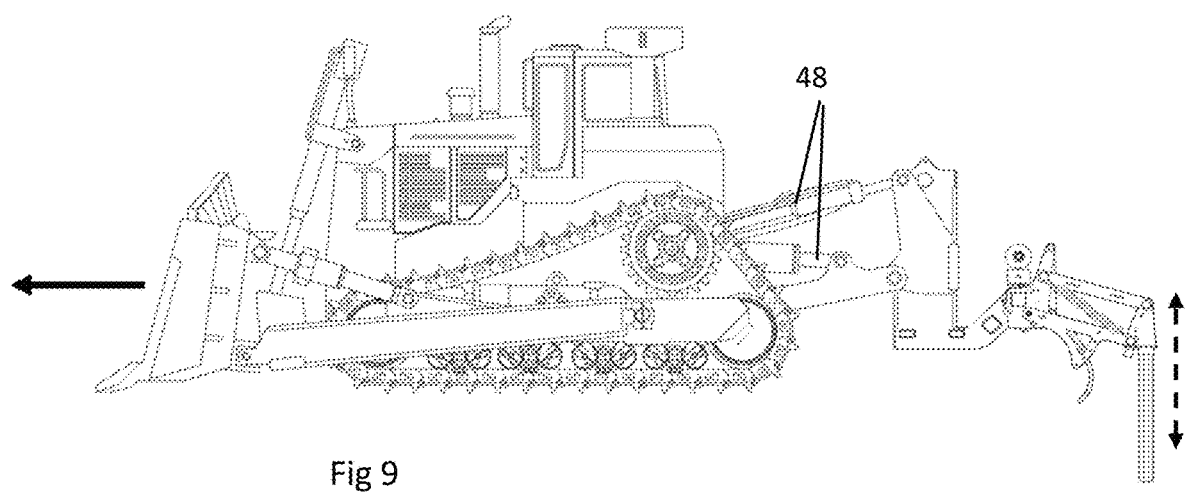
FIG. 9 shows the vehicle of FIG. 8 with the apparatus according to an embodiment of the present invention mounted to a 'ripper box' mount.

As shown in FIGS. 8 and 9, the vehicle may be provided as an earth moving vehicle 42, such as a dozer. The apparatus can be mounted in place of other ground conditioning devices, such as removal of ripping tines and mounting of the apparatus to the ripper box 46.

The apparatus preferably travels behind the vehicle, such as a dozer 42, and can be lowered, such as by a powered mount 48 connected to the vehicle. Thus, the vehicle may provide height control for the apparatus, such that the brush(es) 12 sweep particulate at a preferred height/depth.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An apparatus for use in seeding, the apparatus comprising:
 a soil manipulation apparatus;
 a brush arrangement comprising at least one brush arranged to follow the soil manipulation apparatus, wherein, in use, the at least one brush sweeps fine loose soil particles over seed distributed onto a surface of a soil profile created by the soil manipulation apparatus; and
 a breakout coupler positioned to cause coupling of a breakout motion of the soil manipulation apparatus with a breakout motion of the at least one brush when, in use, the soil manipulation apparatus breaks out of engagement with the soil and a motion of the soil manipulation apparatus following breakout causes the soil manipulation apparatus to act on the breakout coupler;
 wherein the soil manipulation apparatus acting on the breakout coupler causes the breakout motion of the at least one brush whereby the at least one brush lifts from engagement with the soil; and
 wherein, in use, the soil manipulation apparatus and the brush arrangement operate independently until coupling of the breakout motion of the soil manipulation apparatus with the breakout motion of the at least one brush.

2. The apparatus of claim 1, wherein the apparatus comprises a structure to mount to a vehicle or be self-powered or to attach to a vehicle as a trailer for towing.

3. The apparatus of claim 1, wherein the brush arrangement comprises at least one brush height mechanism accommodating upward and downward motion of the at least one brush.

4. The apparatus of claim 3, wherein the at least one brush height mechanism comprises at least one linkage arrangement.

5. The apparatus of claim 4, wherein the at least one linkage arrangement comprises at least one four-bar linkage mechanism.

6. The apparatus of claim 5, wherein the at least one four-bar linkage comprises laterally spaced four bar linkage mechanisms.

7. The apparatus according to claim 1, comprising at least one seed delivery outlet provided to deliver seeds ahead of a respective one of the at least one brush.

8. The apparatus of claim 7, wherein the at least one seed delivery outlet receives seeds from a seed delivery device, a seed metering device or an air seeder.

9. The apparatus of claim 8, wherein the seed delivery device, seed metering device or air seeder is vehicle mounted or mounted on a support frame of the apparatus.

10. The apparatus of claim 7, wherein the seeds are provided as loose seeds, or in seed carriers, pellets, pats, pucks or balls bearing the seeds.

11. The apparatus of claim 1, wherein the soil manipulation apparatus comprises at least one soil engaging tool on a tool support to loosen rocky, compacted or crusted soil to provide loose fines for sweeping by a respective one of the at least one brush.

12. The apparatus of claim 11, wherein the at least one soil engaging tool comprises at least one of a grader blade, plough blade or disc, disc opener, ripper tooth, tiller blade, or a combination selected from at least two or more thereof.

13. The apparatus of claim 11, wherein the soil manipulation apparatus comprises a breakout with adjustable pre-load or lift mechanism to lift the at least one soil engaging tool and/or the tool support.

14. The apparatus of claim 11, wherein the breakout coupler enables the brush arrangement to lift or fall, matching motion of the at least one soil engaging tool and/or the tool support.

15. The apparatus of claim 1, wherein the apparatus comprises multiple breakout coupler attachment positions.

16. The apparatus of claim 1, comprising rest position means for controlling a rest position of the brush mechanism and/or the at least one brush.

17. The apparatus of claim 16, comprising at least one biasing means to control the rest position of the brush mechanism as well as controlling down force provided by the at least one brush to the soil.

18. The apparatus of claim 17, wherein the biasing means comprises at least one spring, at least one weight, at least one elastomer member, or a combination of any two or more thereof.

19. The apparatus of claim 1, comprising a position lock for locking the position of the brush mechanism to restrict a degree of freedom of movement of a respective one of the at least one brush.

20. The apparatus of claim 1, comprising a motion limiter for limiting or restricting range of motion of at least one four bar mechanism that controls height/position of the at least one brush.

21. The apparatus of claim 1, comprising a seed spreading device, a seed delivery device or seed diffuser to regulate distribution of the seeds across a width of the at least one brush.

22. A method of seeding comprising:
travelling an apparatus over terrain comprising soil, the apparatus further comprising at least one seed delivery outlet for delivering seeds ahead of a respective one of the at least one brush, wherein the apparatus comprises:
a soil manipulation apparatus;
a brush arrangement comprising at least one brush arranged to follow the soil manipulation apparatus, wherein, in use, the at least one brush sweeps fine loose soil particles over seed distributed onto a surface of a soil profile created by the soil manipulation apparatus; and
a breakout coupler positioned to cause coupling of a breakout motion of the soil manipulation apparatus with a breakout motion of the at least one brush when, in use, the soil manipulation apparatus breaks out of engagement with the soil and a motion of the soil manipulation apparatus following breakout causes the soil manipulation apparatus to act on the breakout coupler;
wherein the soil manipulation apparatus acting on the breakout coupler causes the breakout motion of the at least one brush whereby the at least one brush lifts from engagement with the soil; and
wherein, in use, the soil manipulation apparatus and the brush arrangement operate independently until coupling of the breakout motion of the soil manipulation apparatus with the breakout motion of the at least one brush;
using the soil manipulation apparatus to loosen soil before seed deposition thereby providing loose soil particles and creating a soil profile;
using the at least one seed delivery outlet, depositing seeds onto a surface of the soil profile; and
using the at least one brush to sweep fine particles of the loose soil over the seeds and lightly cover the deposited seeds with soil, leaving larger soil particles in place over the terrain thereby retaining the soil profile created by the soil manipulation apparatus.

23. The method of claim 22, comprising providing the seed delivery outlet between a ground engaging tool of the soil manipulation apparatus and the at least one brush.

24. The method of claim 22, wherein depositing seeds onto the surface of the soil profile comprises receiving, by the at least one seed delivery outlet, seeds from a seed delivery device and/or a seed metering device.

25. The method of claim 24, wherein the seed delivery device performs delivery of the seed to the at least one seed delivery outlet and/or the seed metering device to the at least one seed delivery outlet by means of an air seeder or gravity.

26. The method of claim 22, comprising sweeping the soil particulates over the seed on the soil surface or in the channel, furrow, recess or hole to a seed depth of up to 25 mm from the swept soil surface over the channel, furrow, recess or hole.

27. The method of claim 22, comprising controlling a rest position of the brush mechanism and/or brush.

28. The method of claim 27, comprising using at least one biasing means to control the rest position of the at least one brush as well as controlling down force provided by the at least one brush to the soil.

29. The method of claim 28, wherein the at least one biasing means comprises at least one spring, at least one weight, at least one elastomer member, or a combination of any two or more thereof.

30. The method of claim 22, comprising locking the position of the at least one brush to restrict a degree of freedom of movement of a respective one of the at least one brush.

31. The method of claim 22, comprising limiting or restricting range of motion of at least one four bar mechanism that controls height/position of the at least one brush.

* * * * *